(12) United States Patent
Duque

(10) Patent No.: US 10,343,774 B2
(45) Date of Patent: Jul. 9, 2019

(54) QUAD ROTOR AIRCRAFT WITH FIXED WING AND VARIABLE TAIL SURFACES

(71) Applicant: Jeremy Duque, Boise, ID (US)

(72) Inventor: Jeremy Duque, Boise, ID (US)

( * ) Notice: Subject to any disclaimer, the term of this patent is extended or adjusted under 35 U.S.C. 154(b) by 227 days.

(21) Appl. No.: 15/210,664

(22) Filed: Jul. 14, 2016

(65) Prior Publication Data

US 2017/0113795 A1  Apr. 27, 2017

Related U.S. Application Data

(60) Provisional application No. 62/192,240, filed on Jul. 14, 2015.

(51) Int. Cl.
*B64C 39/02* (2006.01)

(52) U.S. Cl.
CPC ...... *B64C 39/024* (2013.01); *B64C 2201/021* (2013.01); *B64C 2201/027* (2013.01); *B64C 2201/088* (2013.01); *B64C 2201/165* (2013.01)

(58) Field of Classification Search
CPC ............ B64C 39/024; B64C 2201/146; B64C 2201/141; B64C 2201/027; B64C 2201/12; B64C 2201/021; B64C 2201/165; B64C 2201/088; B64C 29/00; B64C 29/0025
See application file for complete search history.

(56) References Cited

U.S. PATENT DOCUMENTS

| | | |
|---|---|---|
| 2,936,968 A | 5/1960 | Mazzitelli |
| 3,038,683 A | 6/1962 | Rowe |
| 3,086,731 A | 4/1963 | Beckington |
| 3,181,810 A | 5/1965 | Olson |
| 3,907,219 A | 9/1975 | Pharris |
| 5,419,514 A * | 5/1995 | Ducan ............... B64C 29/0033 244/12.4 |
| 6,030,177 A | 2/2000 | Hager |
| 6,340,133 B1 | 1/2002 | Capanna |
| 6,655,631 B2 | 12/2003 | Austen-Brown |
| 6,978,970 B2 | 12/2005 | Purcell, Jr. |
| 8,153,096 B2 | 4/2012 | Smith |
| 8,544,787 B2 | 10/2013 | Lee et al. |
| 8,800,912 B2 * | 8/2014 | Oliver ............... B64C 29/0033 244/12.4 |
| 8,958,930 B2 * | 2/2015 | Malta ....................... B64C 5/02 244/75.1 |
| 9,682,774 B2 * | 6/2017 | Paduano ................ B64C 27/52 |
| 9,694,911 B2 * | 7/2017 | Bevirt .................... B64D 27/24 |
| 9,764,829 B1 * | 9/2017 | Beckman ............... B64C 27/22 |
| 9,834,305 B2 * | 12/2017 | Taylor ............... B64C 29/0025 |
| 2003/0168552 A1 * | 9/2003 | Brown .................... B64C 11/46 244/55 |
| 2005/0233672 A1 * | 10/2005 | Shantz ................ A63H 27/001 446/232 |

(Continued)

*Primary Examiner* — Assres H Woldemaryam

(74) *Attorney, Agent, or Firm* — Parsons Behle & Latimer

(57) ABSTRACT

An aircraft with four rotors, a fixed wing, and an adjustable v-tail to allow for both vertical take-off and landing and the capability to fly in straight and level flight. The angle of each rotor and engine, with respect to the airfoil surfaces to which they are attached, is adjustable, allowing for thrust to be directed either downwards, allowing the craft to hover, or backwards, allowing the aircraft to travel horizontally while lift is provided and controlled by the wing and v-tail.

10 Claims, 4 Drawing Sheets

(56) References Cited

U.S. PATENT DOCUMENTS

| | | | | |
|---|---|---|---|---|
| 2005/0236520 A1* | 10/2005 | Wukowitz | ............... | B64C 5/02 |
| | | | | 244/105 |
| 2007/0057113 A1* | 3/2007 | Parks | ...................... | B64C 15/00 |
| | | | | 244/12.5 |
| 2007/0215748 A1* | 9/2007 | Robbins | ............... | B64C 39/024 |
| | | | | 244/12.5 |
| 2010/0230532 A1* | 9/2010 | Dietrich | ................... | B60F 5/02 |
| | | | | 244/49 |
| 2011/0001020 A1* | 1/2011 | Forgac | ............... | B64C 29/0033 |
| | | | | 244/7 A |
| 2011/0168835 A1* | 7/2011 | Oliver | ................ | B64C 29/0033 |
| | | | | 244/12.4 |
| 2013/0193263 A1* | 8/2013 | Schweighart | ............ | B60F 5/02 |
| | | | | 244/2 |
| 2015/0225071 A1* | 8/2015 | Tighe | ...................... | B64C 29/02 |
| | | | | 244/12.4 |
| 2015/0266571 A1* | 9/2015 | Bevirt | .................... | B64D 27/24 |
| | | | | 244/7 C |
| 2015/0314867 A1* | 11/2015 | Razroev | ............. | B64C 29/0033 |
| | | | | 244/119 |
| 2016/0114887 A1* | 4/2016 | Zhou | ......................... | B60F 5/02 |
| | | | | 348/148 |
| 2016/0122016 A1* | 5/2016 | Mintchev | .............. | B64C 39/024 |
| | | | | 244/17.23 |
| 2016/0200436 A1* | 7/2016 | North | .................. | B64C 29/0033 |
| | | | | 244/7 R |
| 2016/0207625 A1* | 7/2016 | Judas | ................ | B64C 29/0025 |
| 2017/0217585 A1* | 8/2017 | Hulsman | ................ | B64C 29/02 |

\* cited by examiner

QUAD ROTOR AIRCRAFT WITH FIXED WING AND VARIABLE TAIL SURFACES

CROSS-REFERENCE TO RELATED APPLICATIONS

This application, under 35 U.S.C. § 119, claims the benefit of U.S. Provisional Patent Application Ser. No. 62/192,240 filed on Jul. 14, 2015, and entitled "Aircraft Design," the contents of which are hereby incorporated by reference herein.

FIELD OF THE DISCLOSURE

This disclosure relates generally to aircraft design. In particular, this disclosure relates to fixed wing aircraft with adjustable rotors and tail segments.

BACKGROUND

Quad-rotor aircraft are an increasingly common form of aircraft used in a variety of small to mid-size designs of primarily unmanned aircraft. Quad-rotor aircraft are desirable for their ability to take-off and land vertically and the simplicity of their design. Because they are controlled entirely by varying the application of power to the four rotors, quad-rotor craft can use fixed rotors and do not need variable-pitch rotors such as those found in helicopters, greatly reducing both the complexity and cost of the aircraft.

However, quad-rotor aircraft are unable to cover ground as efficiently, or quickly, as fixed-wing aircraft when travelling over long distances, and are unable to loiter over an area as efficiently as a circling fixed-wing aircraft can at a reduced power-setting. These deficiencies limit the general usefulness of the quad-rotor design.

Likewise, fixed-wing aircraft are unable to land or take-off in as short a distance as quad-rotor craft, which in turn limits the general usefulness of the fixed-wing design. Thus, a clear trade-off in endurance and versatility exists between the two designs, and an operator must often choose to accept the inherent limitations of either design over the other when choosing the kind of aircraft best suited to the demands of a given operation. Other drawbacks and limitations of existing devices are also present.

SUMMARY

Accordingly, disclosed embodiments address the drawbacks and limitations of existing devices. Other advantages of disclosed embodiments also exist.

For example, disclosed embodiments address the trade-offs in operational capabilities between fixed-wing and quad-rotor aircraft. Embodiments are designed to be as versatile as single engine and multiengine rotorcraft in take-off, landing, and hovering while preserving the long-distance endurance and efficiencies of fixed-wing aircraft. Disclosed embodiments allow take off in close-quarters and hovering in a vertical-thrust configuration, but are still able to travel long distances and/or loiter over an area at reduced power settings in a horizontal-thrust configuration.

Disclosed embodiments also include an aircraft whose core structure includes an up-forcing airfoil with control surfaces, or wing, and two smaller down-forcing airfoils, or tail surfaces. In some embodiments, the two tail surfaces are able to fold up and down, so that they may alternate form being at an angle parallel to the wing to forming a 'V' shape when viewed from behind (referred to herein as a "v-tail"). Embodiments of the v-tail allow for the same control of both pitch and yaw provided by a traditional "t-tail" through the coordinated use of the control surfaces on each v-tail surface when the aircraft is traveling horizontally in straight and level flight.

In some embodiments, propulsion is generated by four motor-driven, or engine-driven, sources of thrust which are located on the wing and tail. As used herein, "motor," "engine," "motor-driven," and "engine-driven" are used interchangeably to mean any sort of electric, combustion-based, or other prime mover that turns a rotor, blade, or other propeller to generate a source of thrust. These sources of thrust are able to rotate into a forward position when engaged in horizontal, wing-sustained flight, and rotate upwards when engaged in vertical, thrust-sustained flight.

In some embodiments, the main wing remains stationary and the tail folds outwards when adjusting to vertical flight in order to lower the rear two sources of thrust so that they are able to rotate upwards and generate downward thrust. Additionally, for embodiments that use screw propellers as the source of thrust, they may be arranged so that the blades rotate in a direction opposite to the adjacent propellers to ensure that the torque generated by each engine would be balanced by the other engines. This configuration allows for steady flight similar to that of "quadcopter" aircraft; lift is controlled by engine power-setting, pitch by increasing the power in the front or rear to engines, roll by increasing power in the right or left two engines, yaw by temporarily changing the balance in torque in the counter-rotating blades, and forward velocity is achieved by tilting the aircraft forward.

For embodiments in a horizontal-thrust configuration above a sufficiently high airspeed, the aircraft behaves in flight as a typical fixed-wing airplane; pitch and yaw are controlled by the control surfaces on the v-tail, roll by control surfaces on the wing, lift is generated constantly by the stationary wing, and forward velocity is controlled by engine power setting. Additionally, for embodiments that use screw propellers, the counter-rotational formation implemented for vertical flight also ensures that the aircraft has none of the left-turn tendencies of traditional single-engine propeller airplanes.

Other advantages and features of disclosed embodiments also exist.

Figure 1:
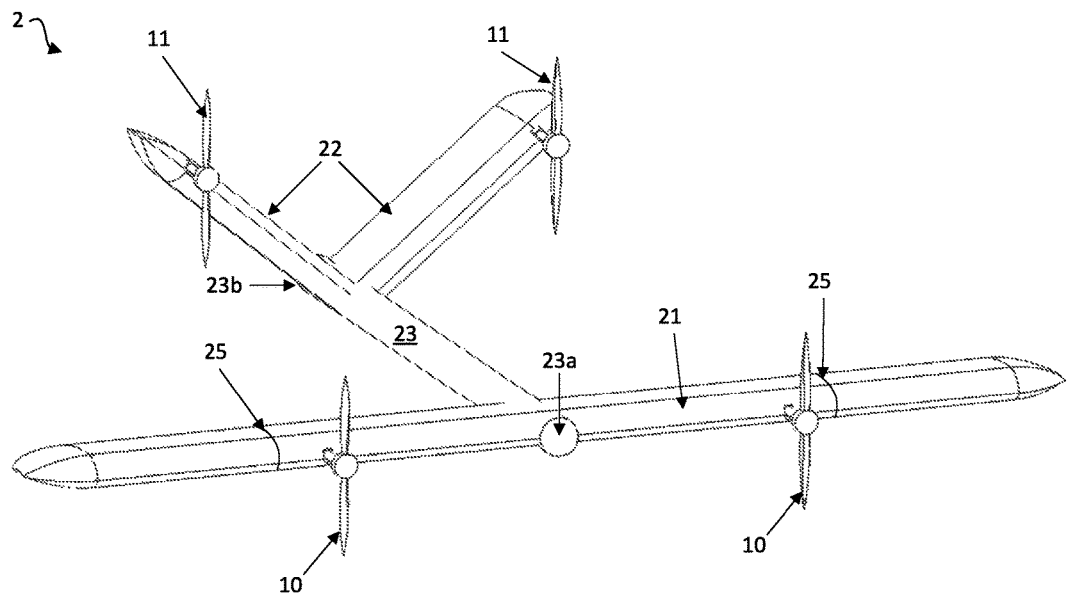
FIG. 1 is schematic representation of a disclosed embodiment of an aircraft in straight and level flight with the engines facing forward, the wing attached to the fuselage at the front of the fuselage, and the empennage arranged in a v-formation with the airfoils facing upwards.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The aircraft 2 in FIGS. 1-6 is composed of a central fuselage 23, to which a lift-generating airfoil, or wing 21, and lift-counteracting airfoils, or tail surfaces 22 are attached in various configurations. Embodiments of aircraft 2 may be constructed so that the wing 21 is attached to the fuselage 23 at the front 23a of the fuselage 23 and the two tail surfaces 22 are attached to the rear 23b of the fuselage 23 as shown for the embodiments in FIGS. 1-3. The aircraft 2 can also be constructed so that the wing 21 is attached to the fuselage 23 at the rear 23b of the fuselage 23 and the two tail surfaces 22 are attached to the front 23a of the fuselage 23 as appears in the embodiments shown in FIGS. 4-5.

Aircraft 2 may also have a variety of other features as is known in the art. For example, aircraft 2 may have control surfaces (e.g., flaps, ailerons, trim tabs, or the like) mounted on the wing 21 and the two tail surfaces 22 in order to allow the operator to control the roll, pitch, and yaw of the aircraft when in horizontal flight with the sources of thrust 10, 11 facing forward as shown in FIGS. 1, and 3-5. In addition, embodiments of aircraft 2 may also include other features such as, landing gear, a cockpit, a passenger compartment, storage or luggage compartments, windows, doors, and the like. In other embodiments, aircraft 2 may be an unmanned (i.e., drone) aircraft 2. Other configurations are also possible.

Figure 7:
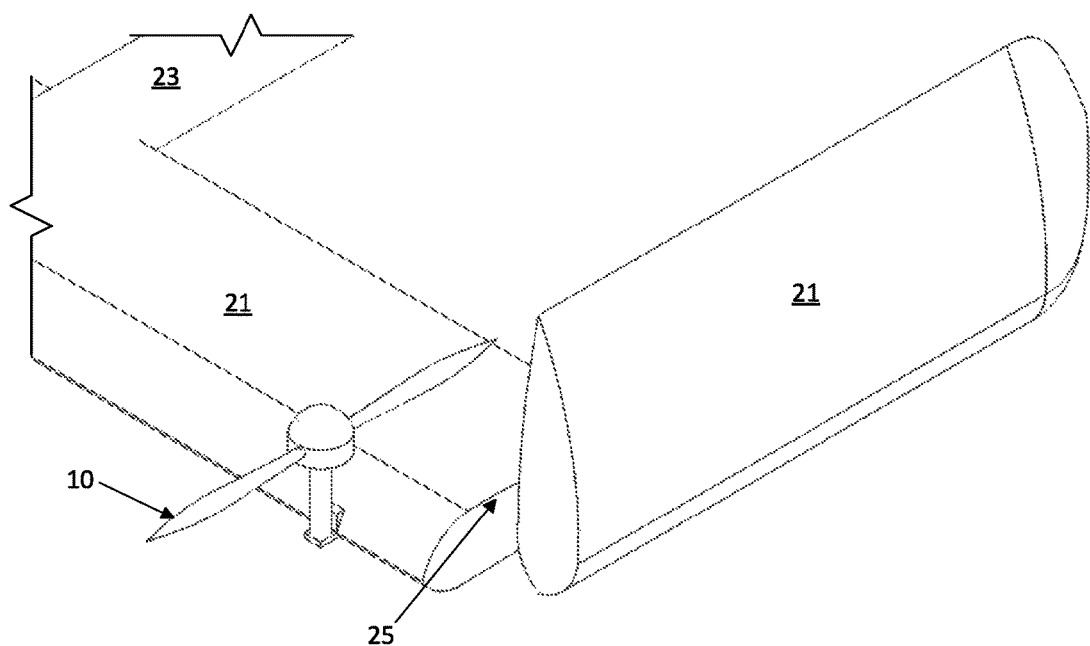
FIG. 7 is a schematic representation of an embodiment of an aircraft with a folded wing along the chord length at a point beyond the forward source of thrust.

In some embodiments, aircraft 2 may have foldable wings 21 for the purposes of reducing the aircraft 2 footprint, or the like. For example, wing 21 may fold along the chord length at a point 25 (as indicated schematically on FIG. 1 and shown in the folded position in FIG. 7) beyond both sources of thrust 10. Other configurations are also possible.

Figure 2:
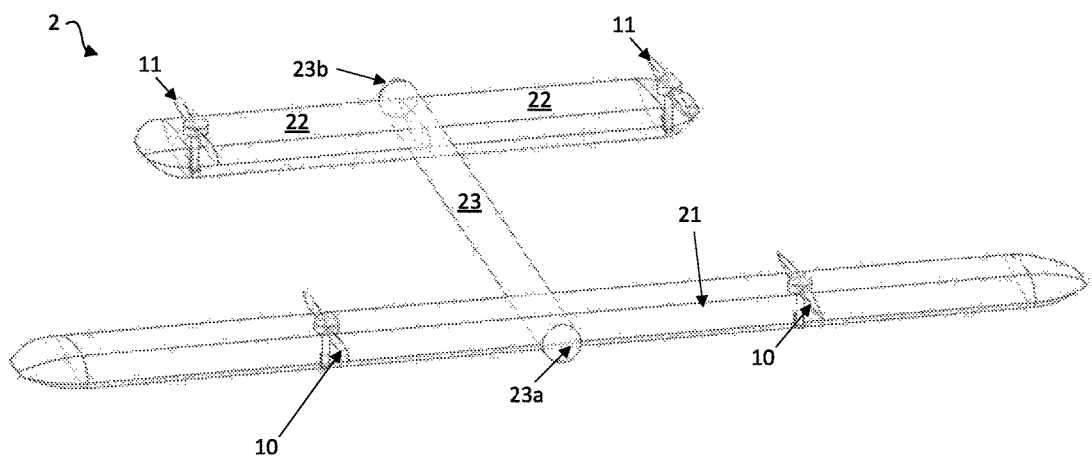
FIG. 2 is a schematic representation of a disclosed embodiment of an aircraft when hovering, taking-off, and landing vertically, with all engines facing forwards.

When the aircraft 2 is in a vertical-thrust configuration, as shown in FIG. 2, the aircraft 2 may be controlled by varying the application of power to each of the sources of thrust 10, 11. Changing the application of power in each of the sources of thrust 10, 11 allows an operator to control, among other things, the roll, pitch, and yaw of the aircraft 2.

Figure 3:
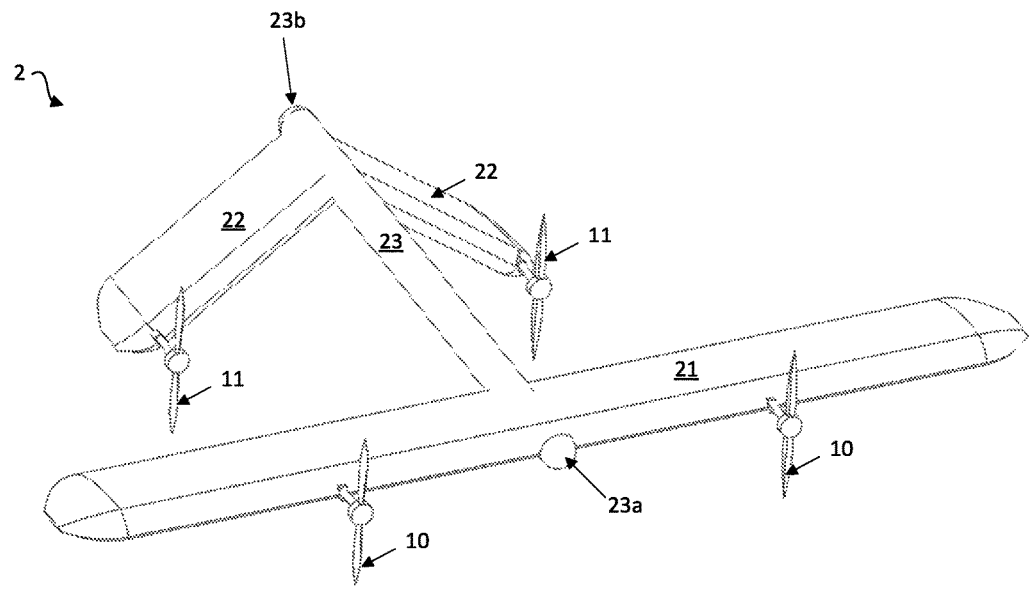
FIG. 3 is a schematic representation of a disclosed embodiment of an aircraft in straight and level flight with the engines facing forward, the wing attached to the fuselage at the front of the fuselage, and the empennage arranged in a v-formation with the airfoils facing downwards.
Figure 4:
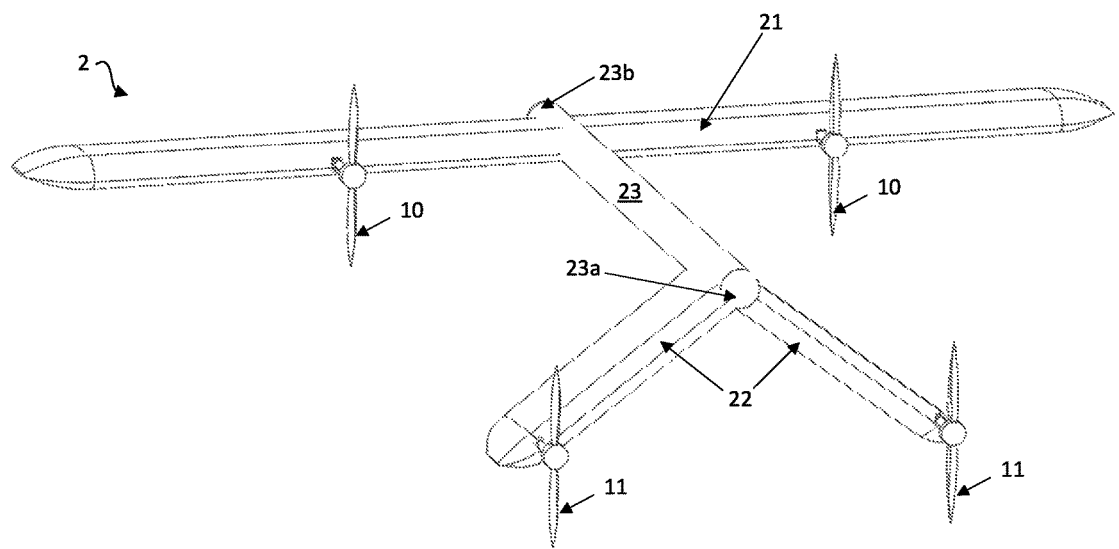
FIG. 4 is a schematic representation of a disclosed embodiment of an aircraft in straight and level flight with the engines facing forward, the wing attached to the fuselage at the rear of the fuselage, and the empennage arranged in a v-formation with the airfoils facing downwards.
Figure 5:
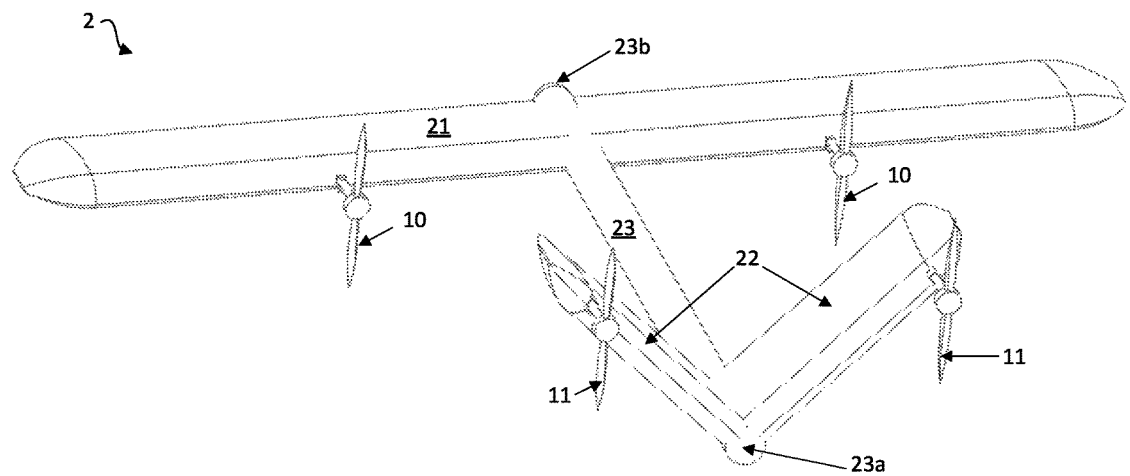
FIG. 5 is a schematic representation of a disclosed embodiment of an aircraft in straight and level flight with the engines facing forward, the wing attached to the fuselage at the rear of the fuselage, and the empennage arranged in a v-formation with the airfoils facing upwards.

In some embodiments, the tail surfaces 22 rotate from being generally flat and parallel as shown in FIG. 2, to a position at an angle with respect to the wing 21, either above the plane of the wing (as shown in FIGS. 1 and 5), or below the plane of the wing (as shown in FIGS. 3 and 4). Typically, the angle between both tail surfaces 22 and the wing 21 must be generally equivalent and constant to ensure steady flight. Either configuration (e.g., tail surfaces 22 above the wing 21, or below the wing 21) will allow an operator to control the pitch and yaw of the aircraft 2 when in horizontal flight with the sources of thrust 10, 11 facing forward as in FIGS. 1 and 3-5.

Rotation of the tail surfaces 22 may be accomplished in any suitable manner. For example, motors, gearing, pulleys, actuators, hinges, or the like, may enable tail surfaces 22 to rotate about the fuselage 23.

The sources of thrust 10 mounted to the wing 21, illustrated schematically and exemplarily in FIGS. 1-6 as screw propellers, may be mounted to wing 21 equidistantly from the center of the wing 21 as in FIGS. 1-5. While FIGS. 1-6 exemplarily show sources of thrust 10, 11 as screw propellers, the disclosure is not so limited, and other sources of thrust 10, 11 may be used, such as jet engines, turbines, other types of propellers, and the like. Sources of thrust 10, 11 are able to rotate at least 90 degrees from facing forwards and parallel to the fuselage 23 (e.g., shown in FIG. 1) to rotating upwards and perpendicular to the fuselage 23 (e.g., shown in FIG. 2). When the sources of thrust 10 face forwards thrust is directed to the rear 23b of the aircraft 2 as in the configurations shown in FIGS. 1 and 3-5. When sources of thrust 10, 11 are facing upwards (e.g., shown in FIG. 2), thrust is directed downwards to the ground as in FIGS. 2 and 6.

Rotation of the sources of thrust 10, 11 may be accomplished in any suitable manner. For example, motors, gearing, pulleys, actuators, hinges, or the like, may enable sources of thrust 10, 11 to rotate about the wing 21 and tail surfaces 22.

The sources of thrust 11 mounted to the tail surfaces 22, may be mounted on or near the end of each tail surface 22 as shown in FIGS. 1-5. Sources of thrust 11 are able to rotate at least 90 degrees from facing forwards and parallel to the fuselage 23 (e.g., FIG. 1) to rotating upwards and perpendicular to the fuselage 23 (e.g., when the tail surfaces are flat as in FIG. 2). When the sources of thrust 11 face forwards thrust is directed to the rear 23b of the aircraft 2 as in FIGS. 1 and 3-5, when facing upwards thrust is directed downwards to the ground as in FIG. 2.

In addition, while FIGS. 1-5 show two sources of thrust 10, 11 on the wing 21 and tail surfaces 22, other configurations may also be used. For example, more, or less, than two sources of thrust 10, 11 may be used on the wing 21 and tail surfaces 22.

When the two tail surfaces 22 rotate into their bent or "V" position as illustrated in FIGS. 1 and 3-5, the rear sources of thrust 11 rotate forward relatively quickly in order to maximize forward speed, which is necessary to sustain lift in wing-sustained flight. Likewise, when the tail surfaces 22 rotate down into their flat position, the rear sources of thrust 11 must likewise rotate upwards relatively quickly in order to avoid a potential misbalance in lift between the front and rear of the craft.

The appropriate speed of rotation for the sources of thrust 10, 11 and tail surfaces 22 may be accomplished in any suitable manner. For example, appropriate gearing, levers, or actuator speed may be used to rotate at a sufficient rate. Other configurations are also possible.

Embodiments of aircraft 2 may transition from the vertical-thrust configuration depicted in FIG. 2 to the horizontal thrust configuration shown in FIGS. 1 and 3-5 after a sufficient forward airspeed has been reached. Sufficient forward airspeed may be reached in a variety of ways. For example, it may be achieved by pitching the aircraft 2 forward using the sources of thrust 10, 11, or by entering a controlled forward dive to rapidly gain the initial speed required for transition, after which airspeed is maintained by the sources of thrust 10, 11 which are rotated into horizontal, forward-facing positions. Likewise, the aircraft 2 may transition from the horizontal thrust configuration to the vertical thrust configuration by rotating all sources of thrust 10, 11 upwards and waiting for the aircraft 2 to slow to an eventual hover while a neutral pitch is maintained.

Figure 6:
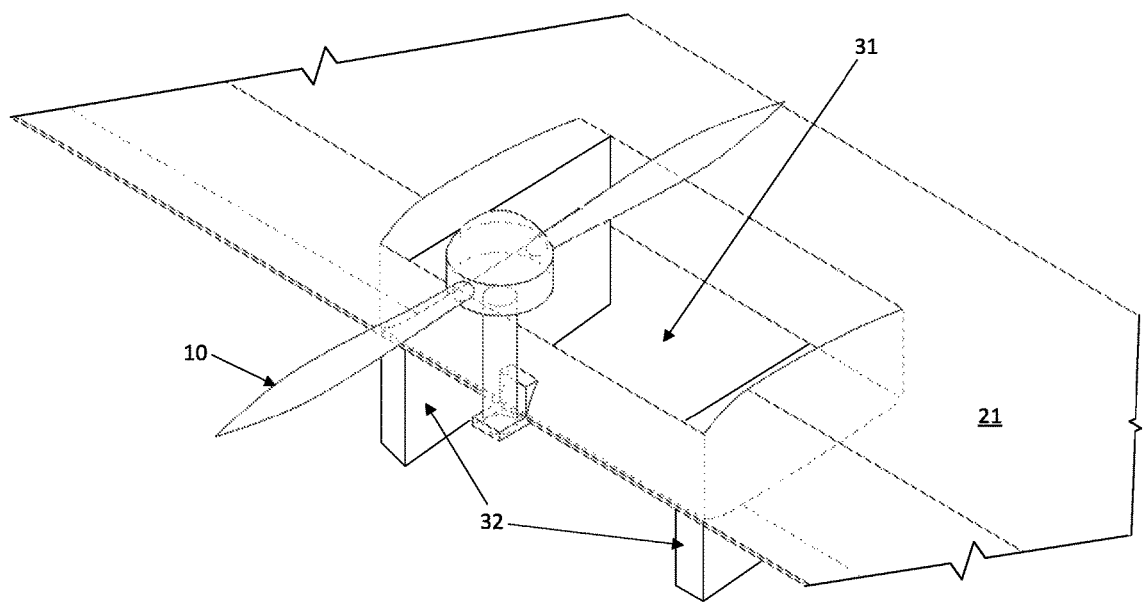
FIG. 6 is a schematic representation of a disclosed embodiment of a source of thrust mounted to the fixed wing as it appears with optional flaps within the airfoil extended to allow for greater thrust from the engine.

Embodiments of the aircraft 2 may also include retractable sections 32 of the airfoil directly under the sources of thrust 10 mounted to the wing 21 as shown in FIG. 6. This allows more air to flow through the opening 31 formed by the retraction of these sections 32, and result in more efficient thrust from the sources of thrust 10. Other configurations are also possible.

Although various embodiments have been shown and described, the present disclosure is not so limited and will be understood to include all such modifications and variations are would be apparent to one skilled in the art.

What is claimed is:

1. An aircraft comprising:
   a wing attached to a fuselage and forming a first plane;
   an empennage having two variable angle tail surfaces that rotate to positions above, below, and parallel to the first plane;
   a forward source of thrust mounted to the wing;
   a rear source of thrust mounted to at least one of the two variable angle tail surfaces; and
   wherein the two variable angle tail surfaces extend horizontally at an angle substantially parallel to the first plane when the aircraft is in a vertical propulsion configuration, and rotate into a v-tail when the aircraft is in a horizontal propulsion configuration.

2. The aircraft of claim 1 wherein the two variable angle tail surfaces are equal in length and size.

3. The aircraft of claim 1 further comprising:
   two forward sources of thrust mounted to the wing equidistant from a center of the fuselage, and
   wherein the two forward sources of thrust direct thrust downwards in a vertical propulsion configuration and rotate substantially forward to direct propulsion towards a rear of the aircraft in a horizontal propulsion configuration.

4. The aircraft of claim 1 further comprising:
   two rear sources of thrust mounted to one each of the two variable angle tail surfaces, and
   wherein the two rear sources of thrust direct thrust downwards in a vertical propulsion configuration and rotate substantially forward to direct propulsion towards a rear of the aircraft in a horizontal propulsion configuration.

5. The aircraft of claim 1 further comprising:
   a front end of the fuselage and a rear end of the fuselage, and
   wherein the wing is mounted near the front end of the fuselage; and
   the empennage is mounted near the rear end of the fuselage.

6. The aircraft of claim 1 further comprising:
   a front end of the fuselage and a rear end of the fuselage, and
   wherein the empennage is mounted near the front end of the fuselage; and
   the wing is mounted near the rear end of the fuselage.

7. The aircraft of claim 1 wherein the wing folds along the chord length at a point along the wing that is further from the fuselage than the distance the forward source of thrust is from the fuselage.

8. The aircraft of claim 1 further comprising:
   a retractable portion in the wing under the forward source of thrust, and
   wherein when the aircraft is in a vertical propulsion configuration the retractable portion retracts to allow air flow through an opening in the retractable portion.

9. The aircraft of claim 1 wherein an angle of the v-tail is adjustable during horizontal flight.

10. The aircraft of claim 3 further comprising:
    two rear sources of thrust mounted to one each of the two variable angle tail surfaces,
    wherein the two rear sources of thrust direct thrust downwards in a vertical propulsion configuration and rotate substantially forward to direct propulsion towards a rear of the aircraft in a horizontal propulsion configuration, and
    wherein the two forward sources of thrust and two rear sources of thrust may rotate substantially simultaneously such that a transition from the vertical propulsion configuration to the horizontal propulsion configuration may be made while the aircraft is in flight.

\* \* \* \* \*